F. J. LEHTONEN.
AUTOMOBILE SLED.
APPLICATION FILED JAN. 21, 1913.

1,104,682.

Patented July 21, 1914.
2 SHEETS—SHEET 1.

Inventor,
F. J. Lehtonen.
By Victor J. Evans,
Attorney.

Witnesses:
Christ Feinle, Jr.
James A. Koch

F. J. LEHTONEN.
AUTOMOBILE SLED.
APPLICATION FILED JAN. 21, 1913.

1,104,682.

Patented July 21, 1914.
2 SHEETS—SHEET 2.

Witnesses:
Christ Feinle, Jr.
James R. Kochs

Inventor,
F. J. Lehtonen.
By Victor J. Evans,
Attorney.

UNITED STATES PATENT OFFICE.

FRANK JALMAR LEHTONEN, OF NEGAUNEE, MICHIGAN.

AUTOMOBILE SLED.

1,104,682.

Specification of Letters Patent. Patented July 21, 1914.

Application filed January 21, 1913. Serial No. 743,356.

*To all whom it may concern:*

Be it known that I, FRANK JALMAR LEHTONEN, a citizen of the United States, residing at Negaunee, in the county of Marquette and State of Michigan, have invented new and useful Improvements in Automobile Sleds, of which the following is a specification.

This invention relates to runner attachments for vehicles, and particularly to means whereby an automobile or like motor driven carrier may be converted into a sleigh and the driving mechanism of the machine used as a propelling force.

Another object of the invention is to provide an attachment of this character wherein will be included rear driving runners that may be operatively connected with the driving mechanism of an automobile without requiring any changes in the construction thereof.

A still further object of the invention is the provision of means on the rear driving runners for maximizing the skidding resistance surfaces thereof and for preventing any sudden drifting of the machine on the initial starting of the driving motor.

With these and other objects in view, the invention consists of certain novel features of construction, combination and arrangement of parts, as will be hereinafter described and claimed.

Figure 1:
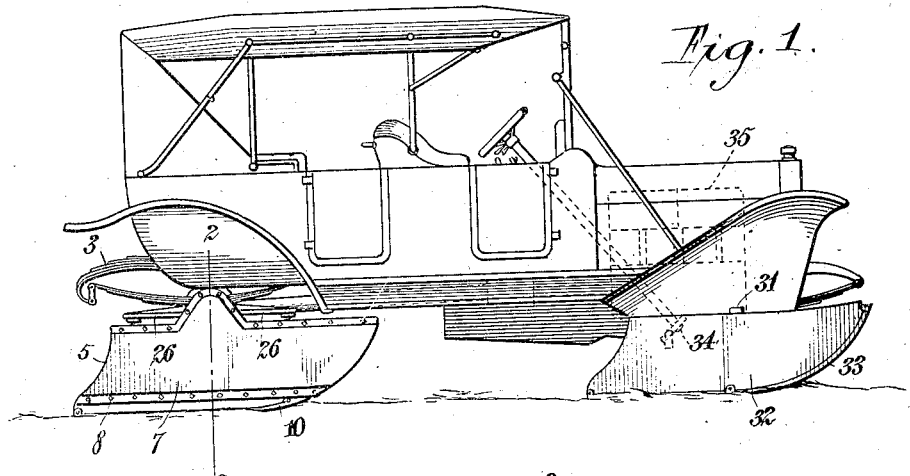
Figure 2:
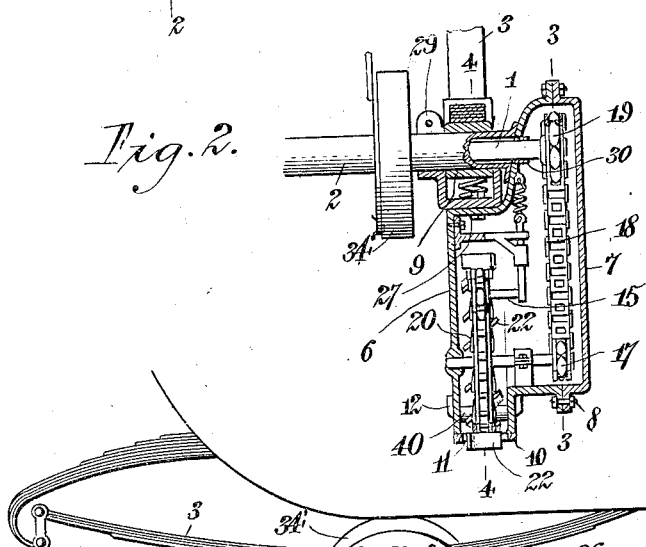
Figure 3:
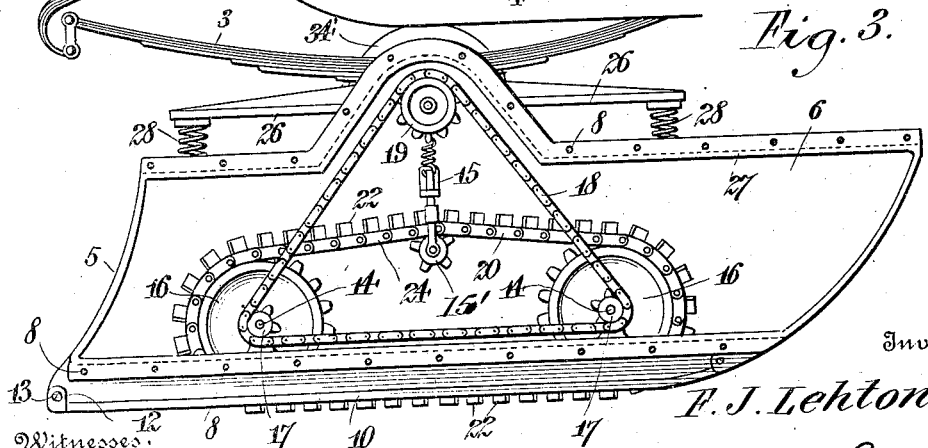
Figure 4:
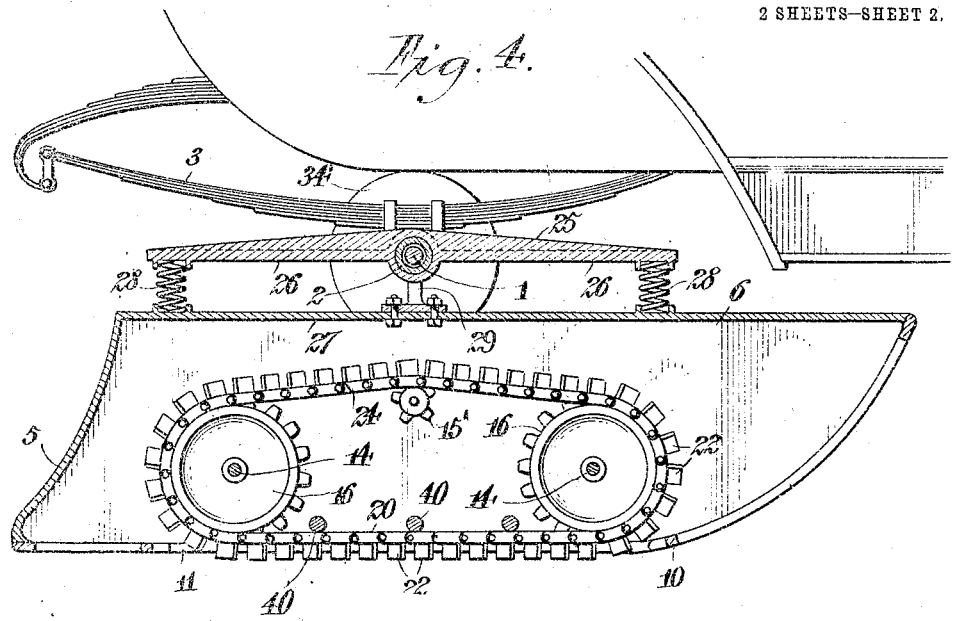
Figure 5:
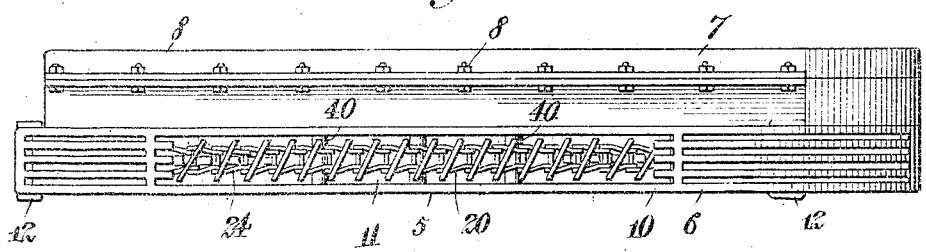

In the accompanying drawings:—Figure 1 is a side view of an automobile, showing the runner attachment applied thereto; Fig. 2 is a section on line 2—2 of Fig. 1; Fig. 3 is a section on line 3—3 of Fig. 2; Fig. 4 is a section on the line 4—4 of Fig. 2; Fig. 5 is a bottom plan view of one of the driving runners.

The automobile conventionally shown herein is provided with a rear driving axle 1 including a sleeve 2, in which the axle is journaled and to which the body supporting springs 3 are connected in the usual well known manner.

Rear driving runners 5 are mounted upon the ends of the sleeve 2 and are shown to include casings having separable sections 6 and 7 which are bolted together, as at 8, whereby they may be readily disconnected when it is desired to expose the power transmitting mechanism. The inner sections 6 of said casings are provided with boxes 9, which partly encircle the sleeve 2 and form bearings therefor. Each of the rear runners 5 is provided with two running surfaces 10 which are respectively disposed at the opposite side of a slot 11 in the lower wall of the casing sections 6. Flanges 12 on the lower wall of the casing sections 6 are disposed at the sides of the runner surfaces 10 and secured thereto through the medium of bolts or suitable removable devices 13 so as to permit worn surfaces 10 to be removed when desired and replaced by new surfaces at a minimum cost.

The casing sections 6 are provided with longitudinally adjustable shafts 14, having small driving cog-wheels 17 which are connected by a driving chain 18 with a power transmitting cog-wheel 19 at the end of the axle 1 so that when the latter is revolved power therefrom will be transmitted to the shafts 14. A tensioning mechanism 15 is supported from the casing and is shown to include a sprocket 15' connected with the upper lead of the traction chain 20.

The traction chain 20 passes over and around the companion sprocket gears 16, being arranged thereon whereby one lead of the chain will always be disposed between the walls of the slot 11 with a resultant exposure of the spurs 22 with the surface of the ice. The surfaces 10 are provided with longitudinally extending ribs, which are adapted to obtain such purchase with the ice as will positively prevent the side drifting of the sleigh when power is applied to the driving chains. The spurs 22 are preferably flat, being rigidly secured to the links 24 of the chains and diagonally arranged thereon or disposed substantially at an obtuse angle with the running surfaces 10, whereby to coöperate with the ribs and thereby maximize the skidding resistance of the runners.

Brackets 25 are secured to the axle sleeve 2 and as shown said brackets include oppositely extending portions 26, which are disposed in spaced relation to the top walls 27 of the casing sections 6. Springs 28 are interposed between the said top walls 27 and the extensions 26 so as to permit the rear runners to yield and to accommodate themselves to imperfections or irregularities in the surfaces over which they are traveling. Straps 29 upon the casing sections 6 are connected with the sleeve 2 so as to permit rocking movements of the casings concentric of the sleeve. The axle extremities on which the driving cog gears 19 are mounted, are preferably mounted in bearings 30 in the casing sections 6.

The front axle 31 is provided with runners 32 having continuous running surfaces 33, which are operatively connected with the steering mechanism 34 of the machine so that the latter may be guided in any direction. A brake band 34' is connected in the usual manner with the rear driving axle 1 so that the machine may be brought to an immediate standstill when the engine is stopped. The engine or driving motor 35 is connected in the usual well known manner with the rear axle of the automobile which is conventionally illustrated.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

1. In combination, a vehicle having a rear driven axle, a sleeve embracing the axle, brackets secured on the sleeve and having forwardly and rearwardly extending arms, casings mounted for rocking movements on the sleeve and into which the ends of the axle extend, said casings having inner portions arranged below the brackets, cushioning springs between the upper sides of the upper portions of the casings and the ends of the said bracket arms, propelling mechanisms in the casings and driving connections between the ends of the axle and the propelling mechanisms.

2. The combination with a vehicle having a driven axle, a sleeve embracing the axle, casings carried by the sleeve, the casings having relatively large slots in their bottom walls, traction chains mounted in the casings and having parallel spurs traveling through the slots and arranged diagonally therein, driving means for the chains and longitudinal spaced ribs formed on the bottoms of the casings beyond the ends of the said slots.

In testimony whereof I affix my signature in presence of two witnesses.

F. JALMAR LEHTONEN.

Witnesses:
JOSEPH H. PRIMEAU, Jr.,
MYRTLE FERM.